UNITED STATES PATENT OFFICE.

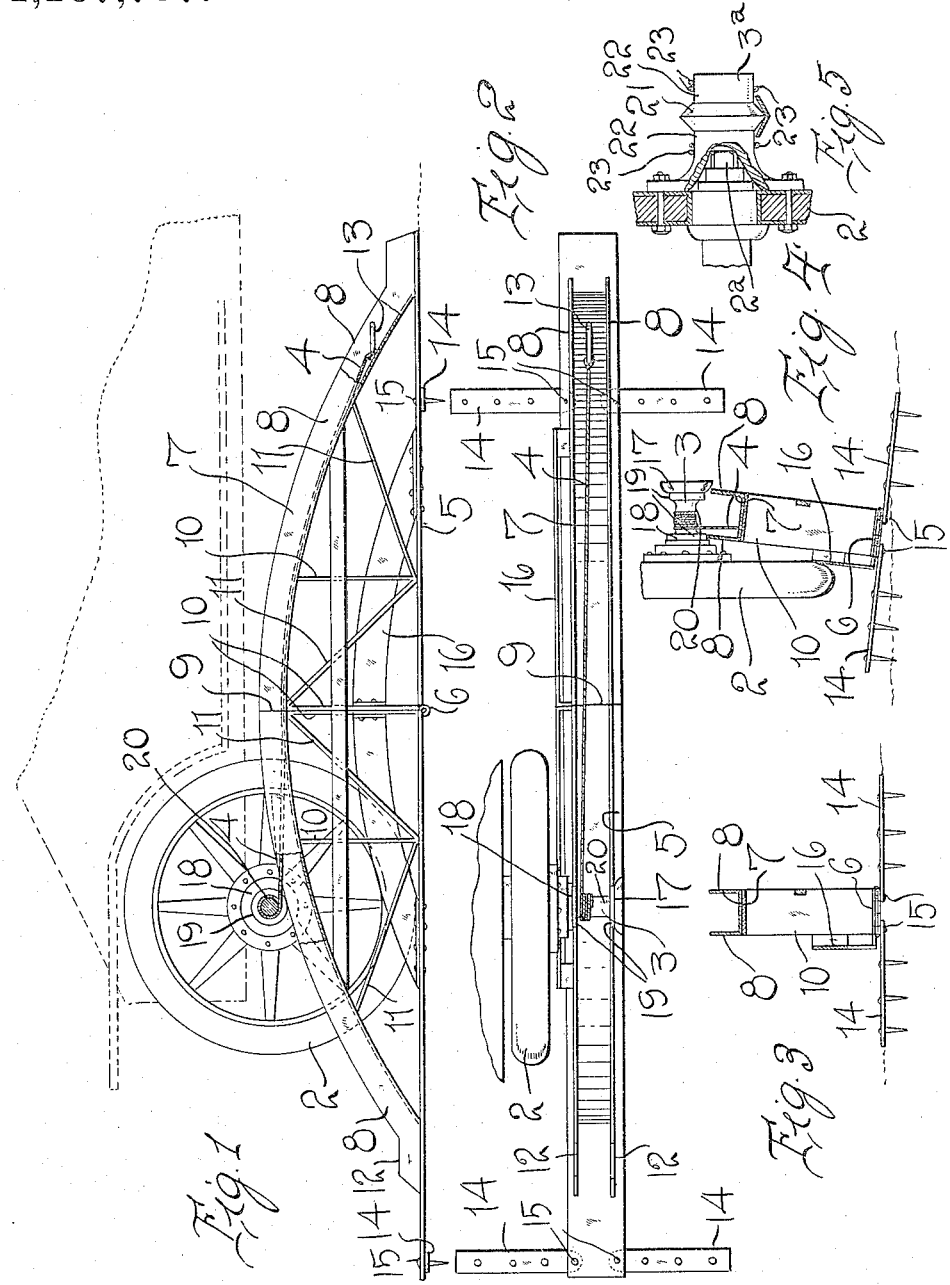

ALFRED J. BERRIEN AND ELBERT I. BOWE, OF HURON, SOUTH DAKOTA; SAID BERRIEN ASSIGNOR TO SAID BOWE.

MUD-JACK FOR AUTOMOBILES.

1,167,737.     Specification of Letters Patent.     Patented Jan. 11, 1916.

Application filed March 17, 1915. Serial No. 15,138.

*To all whom it may concern:*

Be it known that we, ALFRED J. BERRIEN and ELBERT I. BOWE, citizens of the United States, residing at Huron, in the county of Beadle and State of South Dakota, have invented certain new and useful Improvements in Mud-Jacks for Automobiles, of which the following is a specification, reference being had to the accompanying drawings.

Our invention relates to automobile jacks, and particularly to means whereby the wheels of an automobile may be lifted out of the mud, sand, or other material into which they have sunk.

The primary object of our invention is the provision of a very simple and effective means whereby the power of the automobile engine may be used to lift the wheel of the automobile from the mud or sand and draw it out of the mud or sand.

Still another object of the invention is the provision of a truss or support having an upwardly bowed track, and also having means for supporting it firmly upon the surface of the ground, and the provision, in connection with one of the wheels of the automobile, of a winding pulley or drum, so made as to ride upon the track on said truss or support and adapted to wind up a cable which in turn is connected to the farthest end of the truss.

A further object of the invention is to provide, in connection with the mechanism above referred to, means for automatically releasing the winding cable from the truss when the spool or winding drum has passed clear along the upper edge of the truss or support and off of its other end, thus enabling the vehicle to continue in motion after leaving the truss or support without injury to the apparatus.

Our invention is illustrated in the accompanying drawings, wherein—

Figure 1 is a side elevation of our improved mud jack showing an automobile being raised thereby; Fig. 2 is a plan view of the structure shown in Fig. 1; Fig. 3 is a vertical section through the jack; Fig. 4 is a vertical section through the jack showing the action of the parts when the jack is acted upon by a tipping thrust; Fig. 5 is a vertical sectional view through a portion of a vehicle wheel, the winding drum coacting therewith and a portion of the lifting track.

Referring to these figures, 2 designates one of the power wheels of an automobile to which is attached in any suitable manner the winding drum or spool 3, to which a cable 4 is attached in any suitable manner. This winding drum or spool 3 is preferably attached to the hub of the wheel 2 by means of bolts, clamps, or by means of any desired fastenings whereby it may be easily attached or detached.

Adapted to be used in connection with the winding spool or drum is a lifting truss support or elevating track comprising a base plate 5 of any suitable length and having a width sufficient to prevent its sinking into soft ground, this base plate 5 being preferably formed in two sections pivoted to each other at 6 so that the sections may be folded against each other in the manner illustrated in Fig. 1, or taken apart, the purpose of which will later appear. Mounted upon the base plate 5 and supported thereby in connection with bracing means hereinafter referred to, is an inclined track 7 which is preferably curved or bowed longitudinally, as shown, said track preferably being approximately U-shaped in section so as to provide the upwardly extending oppositely disposed flanges 8. Preferably this track is also made in two sections to conform to the two sections of the base plate, the track being split at 9 and the walls 8 of one of the sections being extended slightly so as to overlap the walls 8 of the next adjacent section when the two sections are in alinement with each other. The upwardly bowed track or channel 7 is supported at the adjacent ends of the sections by the upright braces 10 and the radiating braces 11. Preferably each end of the upwardly bowed track or channel 7 is extended horizontally, as at 12, so as to provide for the easy engagement of the spool or winding drum 3 with the track. Disposed at the opposite end of the channel is the outwardly projecting pin 13 which extends tangentially to the curvature of the channel and to which the cable 4 is attached, the cable having an eye formed in one end which may be placed over this pin.

The lower face of the base plate has sufficient area to properly sustain the load placed upon it when in use on soft earth or mud, and at either or both ends it also has additional supporting means provided by toothed wings or folding footings, designated 14, these being pivoted at 15 to the base plate. These greatly add to the stability of the truss or support and brace it against tipping strains incident to a shifting of the load. Preferably the truss is also provided with a protecting shoe or guard 16 on both sides disposed at such a height as will cause it to receive the thrust and rubbing contact of the driving wheel carrying the spool and cable if the truss or support should from any cause be tipped in such a direction as to bring the wheel periphery in contact with the truss (see Fig. 4). These protecting shoes or guards 16 are preferably curved, as shown, their curvature corresponding to the curvature of the inclined track 7.

It will be noted in Fig. 4 that the periphery of the spool and the upper edge of the channel or track are complementally formed, or formed in such a manner that the spool will be maintained in place on said truss even though the truss or support shall be in other than vertical position. As illustrated, the spool has the outer flange 17 and the inner flange 18 which fit on the outside faces or over the outside faces of the flanges 8 and between these flanges 17 and 18 the spool is formed with the annular flat portions 19 which fit on the upper edge of the channel or track. Intermediate of these portions 19 the spool is cut away, as at 20, to receive the cable 4 in the manner heretofore described.

In Fig. 5 I show a vertical sectional view of an automobile wheel with my winding drum applied thereto. The wheel 2 is of the ordinary type and has an ordinary hub cap 2ª. The winding drum 3ª is practically the same as that illustrated in Fig. 4, except that, as will be later stated, and is provided with a plurality of outwardly curved arms which are bolted to the wheel by means of a number of the usual hub flange bolts, these bolts, however, being slightly lengthened so as to allow for the additional thickness of the spool flange. So far the construction is the same as that illustrated in Fig. 4, but in Fig. 5 I show a variation of the winding drum which consists in forming the winding drum with the medially disposed rib 21 defining on each side the winding surfaces 22. A double cable 23 is applied to the drum and is adapted to be connected to a pin 13, as previously described. The supporting track is shown as constructed in the same manner as in Fig. 1 except that the track is V-shaped in cross section so as to accommodate the rib 21 and support the rib for rolling contact.

As previously described, the truss track or jack is formed in two sections hinged together as at 6. This construction is not only to provide for economizing space in transportation, but is also designed so that one section of the truss may be placed beneath one wheel and the other section placed beneath the other wheel of a motor vehicle where both wheels have become stuck in the mud. This will cause the lifted tracks or trusses to terminate at the point 9 in Fig. 1, but it will be understood that the automobile wheel is only lifted a few inches from the ground and that it will do no harm for the wheel to run off the lifted ends of the truck sections and drop. This separation of the two sections may be readily accomplished by withdrawing the pintle of the hinge 6 in an obvious manner.

The manner of operating our invention will be readily apparent from what has gone before. When an automobile or like vehicle is stuck in the mud, or deep sand, the spool 3 is attached to the driving wheel of the automobile and then the truss or supporting jack is disposed with its extension flanges 12 just beneath the spool. The cable is then unwound from the spool and connected to the pin or other attaching member 13. The engine is then started, which will cause the rotation of the spool 3 and the winding up of the cable 4 upon the spool. As the cable is wound up the spool will roll up the inclined edge face of the channel or plate 7, drawing the automobile forward and at the same time lifting it until the wheels clear the mud. Thus when power is applied to the spool or winding drum the cable is wound upon it and this action transfers the weight of the vehicle from the periphery of the drive wheel to this truss or supporting member by the shortening up of the cable, and the spool itself is brought in rolling contact with the top edge of the truss and gradually raised up the inclined edge and stopped. As the cable is connected to the pins 13 by means of eyes or loops, it will be obvious that when the spool passes clear along the upper edge of the truss and off at its other end the cable will automatically release itself from the truss and this enables the vehicle to continue in motion after leaving the truss without danger of any injury to the mechanism.

While we have referred to the use of one jack or track section as illustrated in Fig. 1, and the attachment of the two sections for use where opposite wheels are mired, in some cases more than two lifting jacks or trusses might be used, as for example, when it is necessary to lift some of the newer types of trucks where all four wheels are used as power wheels.

While we have illustrated what we have deemed to be an entirely effective form of our apparatus, we do not wish to be limited to the detailed construction herein described, as it is obvious that many changes may be made without departing from the spirit of the invention as defined in the appended claims.

What we claim is:

1. The combination with an inclined track and a support therefor designed to hold said track rigidly in inclined position, of a connection adapted to be engaged with an automobile to cause the automobile to be raised upon said track.

2. The combination with an inclined track and means for supporting said track in an inclined position, of a flexible connection extending from said track and connected thereto, and a winding drum adapted to be attached to the power wheel of an automobile and upon which such flexible connection is adapted to be wound to thereby cause the automobile to be raised by its own power forwardly and upwardly along and upon the inclined track.

3. A mud jack for automobiles including an upwardly and longitudinally extending track, and means for operatively engaging the axle of an automobile with said track and drawing the automobile forward and up said track.

4. A mud jack for automobiles including an inclined track, a base upon which the track is mounted and adapted to rest whereby to hold it in its inclined position, and means for operatively engaging the axle of an automobile with said track and for drawing the automobile along and upon said track to thereby lift it.

5. A mud jack for automobiles including an inclined track, a base upon which said track is supported in its inclined position, means adapted to be actuated by the power of the automobile for drawing the same upwardly and along the track, and a longitudinally extending guard below said track and extending longitudinally thereof, as and for the purpose set forth.

6. A mud jack for automobiles, including a winding drum adapted to be attached to the power wheel of an automobile and project therefrom, a flexible connection wound thereon, and an elevated lifting track having spaced flanges, the winding drum having spaced portions adapted to have rolling engagement with said flanges, and means at one end of the track for detachably engaging said flexible connection.

7. A mud jack for automobiles including a lifting jack comprising a base plate, an elevated track mounted upon the base plate, means at one end of the track for engaging a cable, and bracing means extending from the base plate to said track.

8. A mud jack for automobiles including a lifting truss comprising a base plate, an elevated track mounted upon the base plate, said track being U-shaped in cross section, bracing means extending between the track and base plate, and laterally extending supporting feet mounted on the base plate.

9. A mud jack for automobiles including a lifting truss comprising a base plate, an upwardly extended track mounted upon the base plate, said track being U-shaped in cross section, bracing means extending between the track and base plate, and laterally extending supporting feet mounted on the base plate, said feet being pivoted to the base plate for movement into or out of parallel relation thereto.

10. A mud jack for automobiles including a lifting truss comprising a base plate, an upwardly extended track mounted upon the base plate, said track being U-shaped in cross section, bracing means extending between the track and base plate, and laterally extending supporting feet mounted on the base plate, said feet being provided with downwardly projecting spurs.

In testimony whereof we hereunto affix our signatures in the presence of two witnesses.

ALFRED J. BERRIEN.
ELBERT I. BOWE.

Witnesses:
J. L. FOXTON,
BERT E. INGALLS.

Copies of this patent may be obtained for five cents each, by addressing the "Commissioner of Patents, Washington, D. C."